US009655104B1

(12) United States Patent
Vivanco (10) Patent No.: US 9,655,104 B1
(45) Date of Patent: May 16, 2017

(54) CARRIER AGGREGATION SCHEDULING BASED REORDERING DENSITY

(71) Applicant: Sprint Communications Company L.P., Overland Park, KS (US)

(72) Inventor: Daniel A. Vivanco, Sterling, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 51 days.

(21) Appl. No.: 14/798,571

(22) Filed: Jul. 14, 2015

(51) Int. Cl.
*H04W 72/04* (2009.01)
*H04L 12/26* (2006.01)
*H04W 88/08* (2009.01)
*H04W 76/04* (2009.01)

(52) U.S. Cl.
CPC ........... *H04W 72/044* (2013.01); *H04L 43/50* (2013.01); *H04W 72/0406* (2013.01); *H04W 76/048* (2013.01); *H04W 88/08* (2013.01)

(58) Field of Classification Search
CPC ........... H04W 72/044; H04W 72/0406; H04W 76/048; H04W 88/08; H04L 43/50
See application file for complete search history.

(56) References Cited

U.S. PATENT DOCUMENTS

| 8,687,496 | B2 | 4/2014 | Ohta | |
|---|---|---|---|---|
| 8,693,337 | B2 | 4/2014 | Ohta | |
| 8,694,004 | B2 | 4/2014 | Ohta | |
| 8,787,173 | B2 | 7/2014 | Ohta | |
| 2008/0130684 | A1 | 6/2008 | Jiang | |
| 2011/0002281 | A1 | 1/2011 | Terry et al. | |
| 2012/0057490 | A1* | 3/2012 | Park | H04L 5/001 370/252 |
| 2012/0155438 | A1 | 6/2012 | Shin et al. | |
| 2013/0310037 | A1* | 11/2013 | Ji | H04W 36/0083 455/436 |
| 2014/0335863 | A1* | 11/2014 | Wu | H04W 76/048 455/436 |

* cited by examiner

*Primary Examiner* — Duc C Ho (57) ABSTRACT

Examples disclosed herein provide systems, methods, and software to limit the reordering of data packets at a wireless communication device during a communication. In one implementation, a wireless access node may measure reordering density factors related to component carriers providing a communication. Based on the reordering density factors, the access node may determine a packet reordering density, which is related to the number of packets that would be received by the wireless communication device in an undesirable order. Upon determining the packet reordering density, the wireless access node determines whether the density meets criteria and, if the density meets the criteria, generates a second carrier aggregation configuration based on available resources the component carriers.

20 Claims, 7 Drawing Sheets

DATA STRUCTURE
400

| ASYMMETRY DRX CYCLES 410 | TRAFFIC BURST 420 | RESOURCE ASSYMETRY IN CC 430 | NUMBER OF CCs 440 | REORDERING DENSITY 450 |
|---|---|---|---|---|
| VALUE | VALUE | VALUE | VALUE | VALUE |
| VALUE | VALUE | VALUE | VALUE | VALUE |
| VALUE | VALUE | VALUE | VALUE | VALUE |
| VALUE | VALUE | VALUE | VALUE | VALUE |
| VALUE | VALUE | VALUE | VALUE | VALUE |
| VALUE | VALUE | VALUE | VALUE | VALUE |

CARRIER AGGREGATION SCHEDULING BASED REORDERING DENSITY

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some communication systems, wireless access nodes such as eNodeBs, femtocells, and the like may employ carrier aggregation to assist in providing wireless coverage to connecting devices. Carrier aggregation allows multiple component carriers to be aggregated to supply increased bandwidth and bitrate to the wireless devices. For example, a wireless access node may transfer data to a wireless communication device using two frequency carrier components, which may be combined at the wireless communication device to create the completed data communication. However, because devices may power up and power down antennas to conserve battery on a communication device, carrier aggregation communications may be received out of order by the wireless device. These out of order communications cause the device to rearrange the data packets as they are received, or transfer a request for a new packet when it identifies that a packet was not received.

OVERVIEW

Examples herein provide enhancements to overcome packet reordering at a wireless communication device. In one implementation, a method of operating a wireless access node to overcome packet reordering with carrier aggregation includes communicating first signals with a wireless communication device using a first carrier aggregation configuration with a set of component carriers. The method further includes determining an asymmetry value associated with asymmetry of discontinuous reception (DRX) cycles for the set of component carriers, and identifying packet reordering density based on the asymmetry value. The method further provides determining whether the packet reordering density meets density criteria and, if the packet reordering density meets the density criteria, generating a second carrier aggregation configuration based on available resources of the set of component carriers. The method also includes communicating second signals with a wireless communication device using the second carrier aggregation configuration with the set of component carriers.

DETAILED DESCRIPTION

Figure 1:
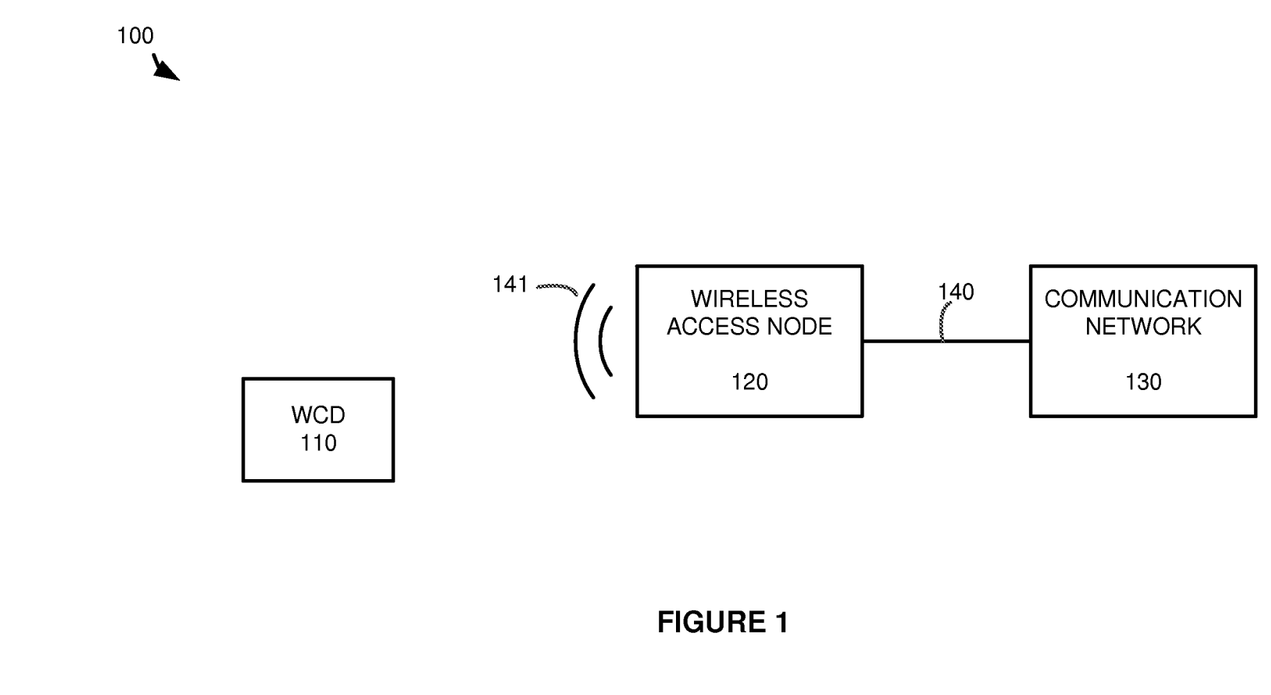
FIG. 1 illustrates a communication system for dynamically modifying carrier aggregation for a data communication.

FIG. 1 illustrates a communication system 100 for dynamically modifying carrier aggregation for a data communication. Communication system 100 includes wireless communication device (WCD) 110, wireless access node 120, and communication network 130. Wireless access node 120 provides wireless signaling to WCD 110 via communication signals 141, and further communicates with communication network 130 via communication link 140.

In operation, WCD 110 communicates with wireless access node 120 to transfer and receive communications for various processes executing on WCD 110. These communications may include communications for gaming applications, email applications, instant messaging applications, file sharing applications, and the like. To provide the required communications, wireless access node 120 communicates with WCD 110 using carrier aggregation. Carrier aggregation allows multiple component carriers to be aggregated to supply increased bandwidth and bitrate to the wireless devices. For example, a wireless access node may transfer data to a wireless communication device using two frequency carriers, which may be combined at the wireless communication device to create the completed data communication.

Although carrier aggregation may supply increased bandwidth to WCD 110, in some implementations, carrier aggregation may cause data packets to be received out of order at the device. In particular, wireless devices may monitor physical downlink control channels (PDCCH) to determine when a carrier component is active for downlink communication. Once a PDCCH signal is received for a carrier component, the device may activate the antenna for that particular carrier component. For example, a communication with WCD 110 may include three carrier components, wherein wireless access node 120 schedules the data packets for each of the components on a first available basis. During the communication, WCD 110 may monitor the control channels to determine when each of the three carrier components are actively transmitting data to the device. However, if one of the carrier components with later scheduled data packets becomes active before another carrier component with earlier scheduled data packets, data may be received by the device in an unintended order, as later scheduled packets would be received before the earlier scheduled packets.

To assist in remedying the ordering issues, wireless access node 120 may identify a reordering density for the communication with WCD 110. This reordering density may be determined based on a variety of factors including, but not limited to, discontinuous reception (DRX) cycle asymmetry for the communication, traffic burst levels for the communication, available resource asymmetry for component carriers, and the number of component carriers involved in the communication. Based on the reordering density, wireless access node 120 may determine if the communications qualify to be transitioned to a second carrier aggregation scheduling configuration that improves packet reordering to WCD 110.

Figure 2:
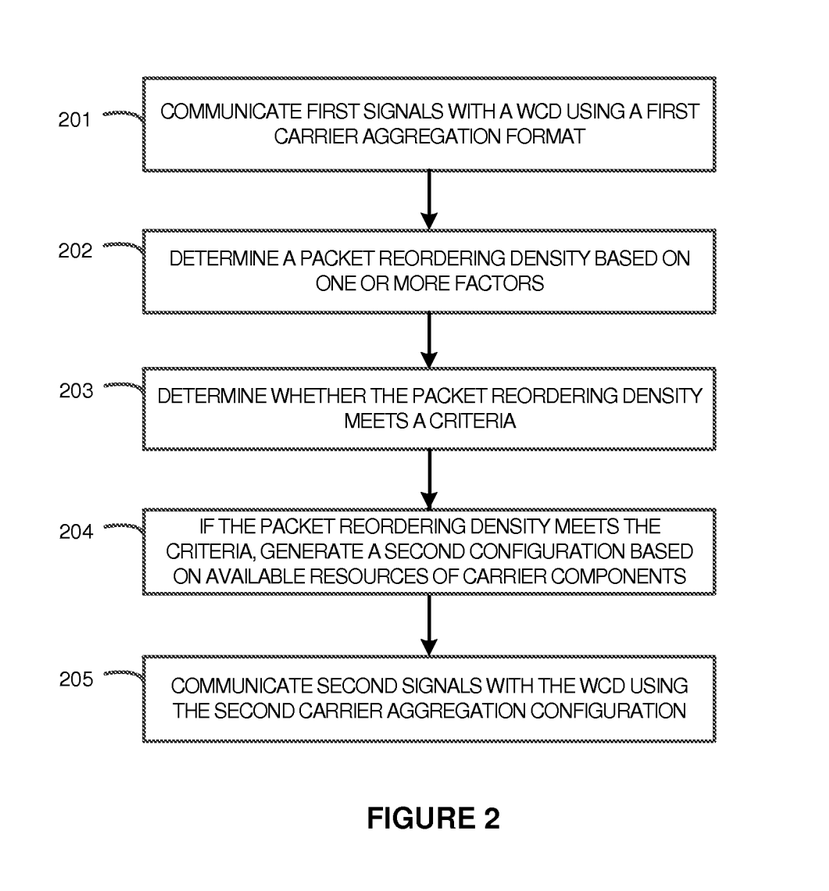
FIG. 2 illustrates a method of operating a wireless access node to dynamically modify carrier aggregation for a data communication.

To further demonstrate the operation of wireless access node 120, FIG. 2 is provided. FIG. 2 illustrates a method of operating wireless access node 120 to dynamically modify carrier aggregation for a data communication. The operations of FIG. 2 are referenced parenthetically in the description below.

As described in FIG. 1, WCD 110 may require communications for a variety of operations executing on the WCD. To supply the data to WCD 110, wireless access node 120 communicates first signals with WCD 110 using a first carrier aggregation format with a first scheduling algorithm (201). This carrier aggregation format includes a set of two or more carrier components that together form the overall band for the communication with WCD 110, and may be scheduled on a first available resource block basis at wireless access node 120. During the communication, wireless access node 120 determines a packet reordering density based on one or more factors (202). These factors may include DRX cycle asymmetry for the communication, traffic burst levels for the communication, available resource asymmetry for component carriers, and the number of component carriers involved in the communication. DRX cycle asymmetry is based on the PDCHH signals from each of the component carriers involved in the communication. In particular, DRX cycle asymmetry includes determining the largest time difference between the PDCHH signal for a first carrier component and a PDCHH signal for a second carrier component. The larger that the time difference is between the signals, the more likely that large amount of packet reordering may be taking place in the communication. Traffic burst levels for the communication are based on the number of surges that are required to make a communication. For example, some applications may require a constant stream of data, whereas other applications on WCD 110 may require data in periodic surges. As the burst level increases for a communication, the more likely that packet reordering is occurring in the communication. In some implementations, the traffic burst levels may be determined using a hurst parameter, which describes "burstiness" in the distribution function of data packets communicated over time. Available resource asymmetry is based on differences in the amount of resources that are available for each of the components. Accordingly, if one carrier component includes more resources than another carrier component, it may result in an increase of packet reordering at WCD 110. The number of component carriers may also factor into the amount of reordering that occurs at the wireless device. Specifically, as the number of components increase, it is more likely that packet reordering is occurring at the wireless device.

In some implementations, values for all four factors may be used to determine a packet reordering density for the communication with WCD 110. However, it should be understood that any number of the factors might be used to determine the reordering density. For example, the packet reordering density may be defined solely on the asymmetry value associated with the asymmetry of DRX cycles in the component carriers.

Once the packet reordering density is determined by wireless access node 120, wireless access node 120 determines whether the packet reordering density meets density criteria (203). In some implementations, packet reordering density may comprise a value, such as a numerical value, letter grade, or some other value, determined from the various density factors described above. This value may then be compared to criteria to determine whether the communication qualifies for a modified carrier aggregation configuration. In other implementations, values for each of the factors may individually be compared with criteria values to determine if the communication qualifies for a modified carrier aggregation configuration.

If the packet reordering density meets the density criteria, wireless access node 120 generates a second carrier aggregation configuration with a second timing algorithm based on available resources of the set of component carriers (204). In some implementations, the second carrier aggregation configuration may instruct data to be distributed among the component carriers based on the available resources of each of the carriers and the timing of PDCCH signals to WCD 110. This scheduling may ensure that data packets are placed in resource blocks based on when they are received by the device, not by when blocks are available at wireless access node 120. In particular, by modifying the carrier aggregation scheduling of the data communication, biased data schedules may be created that push data through component carriers with upcoming PDCCH signal. This data scheduling may further include constraining the allocation of data packets to each of the carrier components based on the available resources that can be provided by each of the carrier components, which prevents a backlog of data packets on individual components.

Once the second configuration is determined for the communication, wireless access node 120 communicates second signals with WCD 110 using the second carrier aggregation configuration (205). In some examples, wireless access node 120 may monitor for changes to the communication with WCD 110. These changes may include the number of carrier components provided to the device, the amount of throughput required for the communication, changes to the PDCCH signal timing for the carrier components, or any other similar changes. Accordingly, the new scheduling configuration may be consistently updated to reflect changes in the structure of the communication.

Figure 3A:
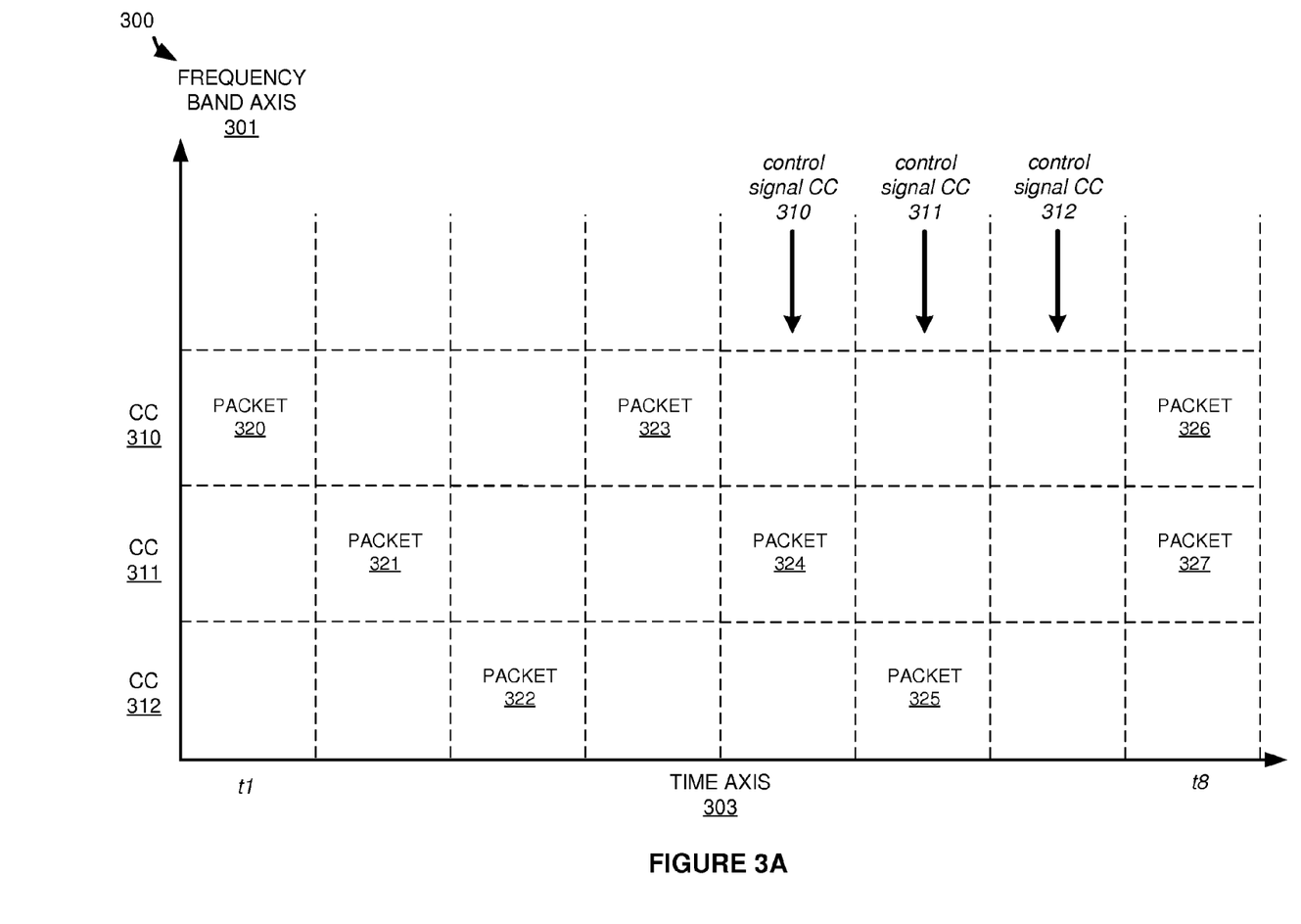
FIG. 3A illustrates a graphical representation of a data communication to a wireless communication device using a first available resource algorithm.

FIG. 3A illustrates a graphical representation 300 of a data communication to a wireless communication device using a first available resource algorithm. Graphical representation 300 includes frequency band axis 301, and time axis 303. Frequency band axis 301 is representative of the frequencies that are used to provide data communications to wireless devices by a wireless access node. Time axis 303 includes time periods from t1 to t8 that represent periods of time for transferring packets to a wireless communication device.

As described herein, wireless access nodes may, by default or otherwise specified by an administrator, schedule data communications to the carrier components on a first available basis as data is received from the communication network. Here, graphical representation 300 includes packets 320-327, which have been scheduled across component carriers (CCs) 310-312. To accomplish the desired communication, control signals, or PDCCH signals, are provided for each of the component carriers to notify the wireless device when a communication is pending. In particular, a first control signal is provided to awaken the device for CC 310 at time period t5, a second control signal is provided to awaken the device for CC 311 at time period t6, and a third control signal is provided to awaken the device for CC 312 at time period t7.

Because of the timing of the control signals, the packets may be received by a wireless communication device in an undesired order, causing the device to request packets that have yet to be received, or reorganize the packets at the device. Here, packets 320 and 323 are received by the device first based on the control signal, followed by packets 321 and 324, then packets 322 and 325. Once all of the component carriers are active for the device, the device may then receive packets 326-327.

In the present example, the wireless access node may be configured to monitor the scheduling behavior for the wireless device to determine whether the carrier aggregation configurations should be modified to account for the order of the packets. This monitoring may include identifying the number of component carriers involved in the communication, in this case three, the time difference between the control signal for CC 312 and the control signal for CC 310, the amount of data resources that can be provided on each of the component carriers, and the burst rate of the communication. Once the reordering data is determined, the data may be used to determine if the communication meets criteria to transition the communication to a second carrier aggregation configuration that schedules the data to compensate for the packet reordering issue. For example, if the communication included a large amount of burst transmissions, then the wireless access node may schedule new communications to the device based on the timing of the control signals for the carrier components and the resources available for each of the components.

Figure 3B:
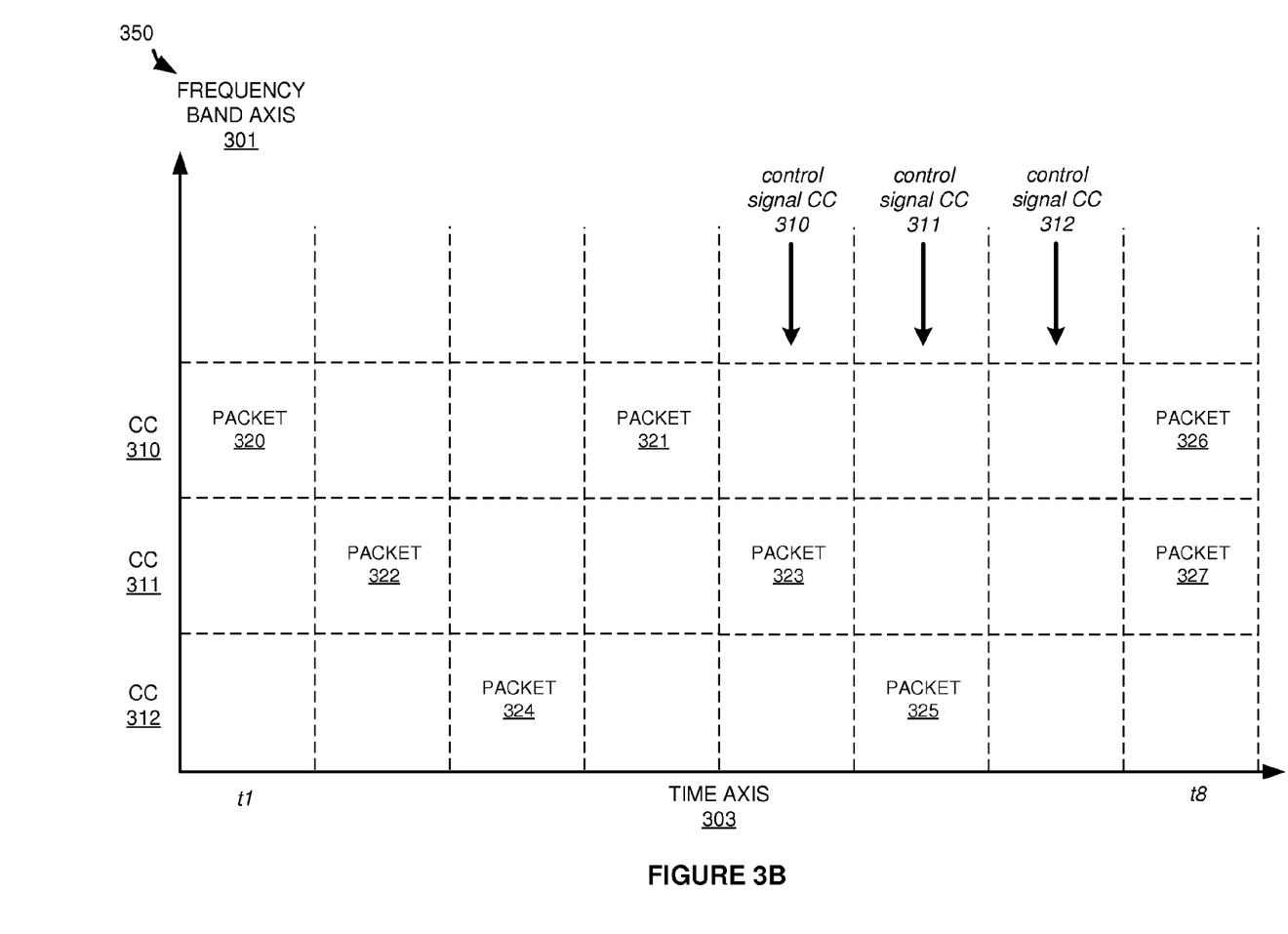
FIG. 3B illustrates a graphical representation of data communication to a wireless communication device using a limited packet reordering algorithm.

To further demonstrate a scheduling algorithm to limit packet reordering at a wireless device, FIG. 3B is provided. FIG. 3B illustrates a graphical representation 350 of a data communication to a wireless communication device using limited packet reordering algorithm. Graphical representation 350 includes the same elements as FIG. 3A, but is an example of scheduling data packets 320-327 based on the timing of control signals, such as PDCCH signals, and the amount of resources for each carrier component. This scheduling algorithm, which occurs when packet reordering density meets defined density criteria, limits the amount of packet reordering that occurs at the wireless device.

In particular, rather than scheduling resource blocks to a communication on a first available basis, the scheduling algorithm of FIG. 3B schedules data packets 320, 321, and 326 in CC 310, schedules data packets 322, 323, and 327 in CC 311, and schedules data packets 324-325 in CC 312. This scheduling, which is based on the occurrence of control signals for CCs 310-312 and the available resources on CCs 310-312, permits data to be received by the wireless device in order, limiting the amount of battery required in reordering the packets.

Figure 4:
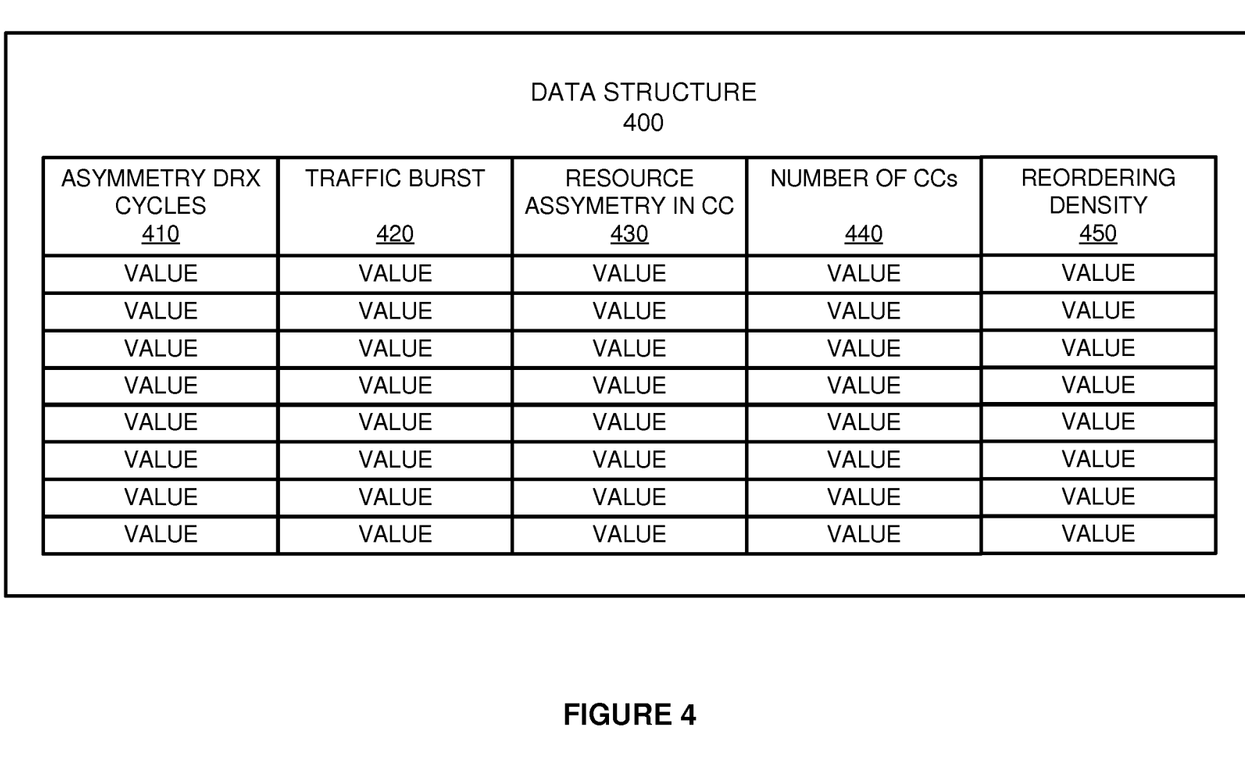
FIG. 4 illustrates a data structure for determining whether a packet reordering density meets density criteria.

FIG. 4 illustrates a data structure 400 for determining whether a packet reordering density meets density criteria. Data structure 400 includes asymmetry DRX cycles 410, traffic bursts 420, resource asymmetry in carrier component 430, number of carrier components 440, and reordering density 450. Although illustrated as a table in the present example, it should be understood that data structure 400 might comprise a data tree, a linked list, an array, or any other data structure capable of making a reordering density value. Further, while demonstrated as deriving a reordering density value using a data structure, it should be understood that in some implementations an algorithm might be applied to the communication factors to determine the reordering density.

In operation, wireless access nodes provide communication services to various wireless communication devices. To provide the communications, the wireless access nodes may be configured to provide carrier aggregation that allows multiple component frequencies to be supplied to a device to improve the bandwidth of communication to the device. In the present example, the wireless access node may initially provide a carrier aggregation configuration that schedules data packets for a communication in first available resource blocks. However, because wireless devices may turn off receivers to limit the amount of battery being used, a portion of the packets that are transmitted using the first available scheduling algorithm may be received by the device out of order.

To assist in limiting the amount of data that is received out of order, the wireless access node may access data structure 400 that allows the node to identify characteristics related to a communication with a device, and determine whether the characteristics qualify for modifying the scheduling algorithm for the communication. Here, the access node determines asymmetry values for DRX clock cycles, traffic burst information for the communication, resource asymmetry in the component carriers, and the number of component carriers used in the communication. Once the information is determined for the communication, the information may be applied to data structure 400. In particular, to identify reordering density 450 for a particular communication, the wireless access node may identify which reordering density value corresponds to the measured characteristics for the communication.

Once the reordering density is determined from data structure 400, the wireless access node may determine if the density meets criteria for modifying the scheduling of the communication. If the density does not meet the criteria, then the communication may be continued using the original scheduling algorithm. In contrast, if the communication does meet the criteria, the wireless access node may transition to a second carrier aggregation configuration with a secondary algorithm for scheduling the communication. In some implementations, the second scheduling algorithm may be based on the timing of the control signals to initiate a carrier component, as well as the resources available on each of the carrier components. Accordingly, rather than scheduling data in the first available resource block, the data may be scheduled in resource blocks for a carrier component that is next to be initiated via a control signal to the device. Similarly, data may be limited to each of the component carriers based on the available resources, ensuring that data from each of the component carriers is not delayed due to a lack of resources.

Although illustrated in the example of FIG. 4 with four components to determine reordering density 450, it should be understood that any number of the components might be used to define reordering density 450. For example, in some implementations, traffic burst 420 may be the loan parameter in determining reordering density 450. Further, although illustrated as a value in the present example, it should be understood that the reordering density might be defined by the individual factors. For example, values for each of the individual factors may be required to meet separate criteria before the device is approved to transition to a secondary scheduling algorithm.

Figure 5:
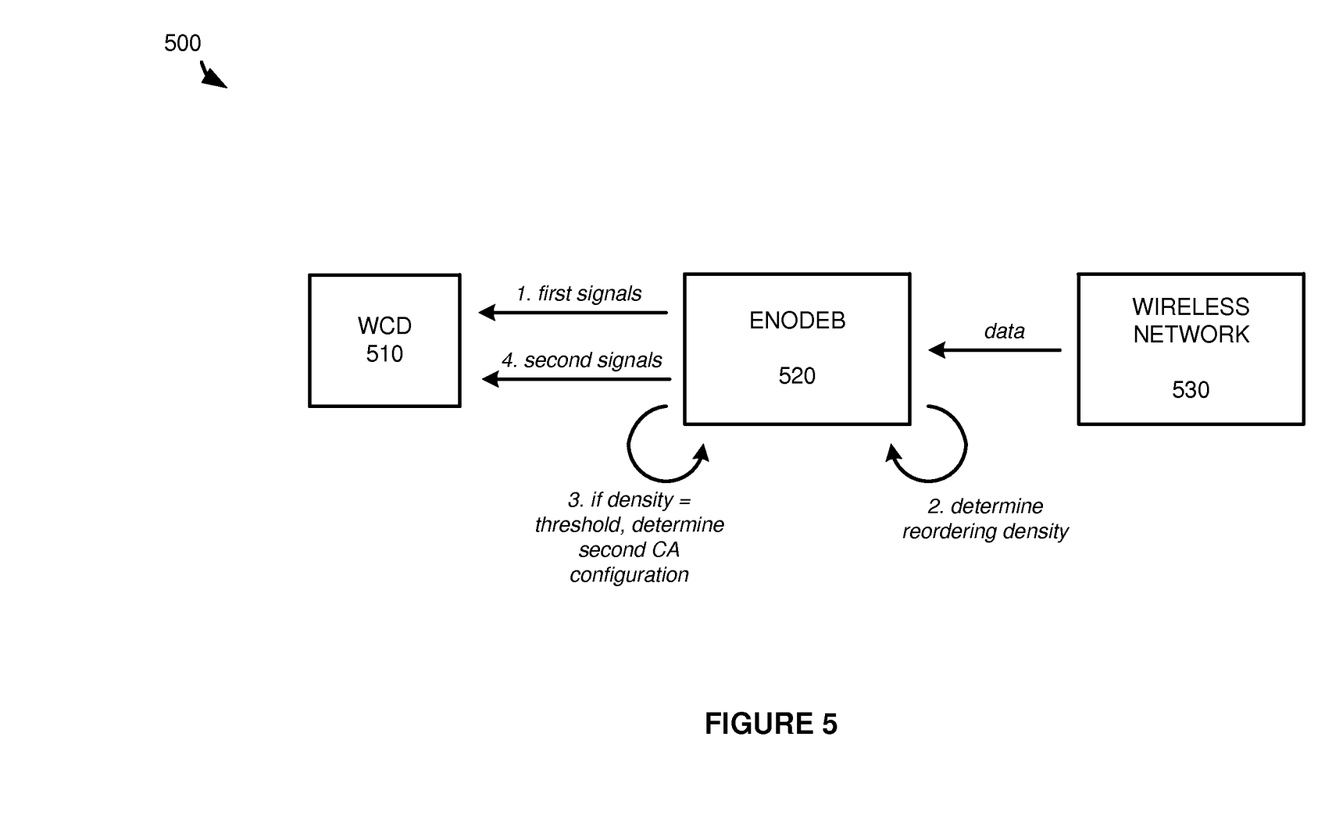
FIG. 5 illustrates an operational scenario of operating a communication system to provide carrier aggregation communications.

FIG. 5 illustrates an operational scenario 500 of operating a communication system to provide carrier aggregation communications. Operational scenario 500 includes WCD 510, eNodeB 520, and wireless network 530. ENodeB 520 is representative of a wireless access node for a Long Term Evolution network that may employ carrier aggregation to provide the desired communications.

In operation, WCD 510 requires eNodeB 520 to provide communication services for various processes and applications on the device. To provide the communications, eNodeB 520 employs a first carrier aggregation configuration with a first scheduling configuration for WCD 510. This scheduling algorithm may schedule packets for WCD 510 on a first available basis, regardless of when the control signals to activate the channels on the device are transmitted. As a result, one or more of the packets may be received out of order when a control signal for a first carrier component is received by the device before second control signal for a second carrier component. Because of the packet ordering, the device is required to reorganize the packets and, in some examples, may request a retransmission of at least one packet if the device determines that a packet is absent from the communication.

To mitigate the effects of reorganizing data packets at the device, eNodeB 520 determines a reordering density for the communication with WCD 510 based on one or more density factors. These factors may include the amount of time between carrier component control signals, the number of carrier components in the communication, the difference in resources of the carrier components, and the burst attributes of the communication. In some implementations, the reordering density may comprise the individual factor values, wherein each of the factor values may be compared to density criteria for the value. If each of the factors meet the corresponding criteria, then eNodeB 520 may transition to a secondary carrier aggregation configuration comprising a secondary scheduling routine for WCD 510.

In other implementations, the various values identified for the reordering density factors may be used to determine a reordering density value that summarizes the factors. This reordering density value, which may comprise a numerical value, a letter grade, or some other value, may be determined using an algorithm that combines each of the factors, a table that relates the factors to a reordering density value, or any other similar method of determining the density value. Once the value is determined, the value may be compared to a criteria value to determine if the communication should be transitioned to a secondary scheduling configuration.

In the present example, the reordering density identified by eNodeB 520 indicates that the communication to WCD 510 should be transitioned to a second carrier aggregation configuration comprising a different scheduling mechanism. In particular, the scheduling mechanism may no longer schedule data packets based on first availability, but may consider information on when command signals are configured to activate each carrier component, the amount of resources on each component carrier to supply data to WCD 510, or other similar information.

In one example, to schedule the data communications for WCD 510, eNodeB 520 may be configured to estimate the number of consecutive packets that can be delivered per component carrier per second, and determine the incoming packet data rate for the communication. Once determined, EnodeB 520 will further determine when, or at what time in the future, control signals will be transferred for each of the component carriers, and sort the times from shortest to latest. Based on the control signal timing and the number of consecutive packets that can be assigned per carrier component, eNodeB 520 may assign a portion or percentage of the incoming packet data rate to each of the component carriers. Once assigned, eNodeB 520 may schedule the packets as they are received from the network to limit the amount of reordering to the device. Accordingly, as illustrated in FIG. 3B, data packets may be scheduled in resource blocks at a later scheduled time, but be received by the wireless device in order.

Figure 6:
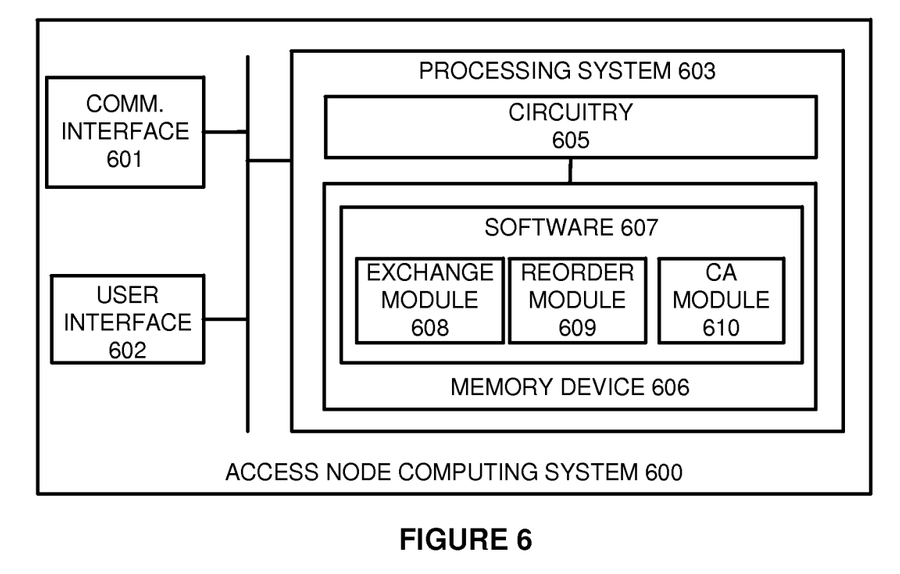
FIG. 6 illustrates an access node computing system to dynamically modify carrier aggregation for a data communication.

FIG. 6 illustrates an access node computing system 600 to dynamically modify carrier aggregation for a data communication. Access node computing system 600 is representative of any computing system or systems with which the various operational architectures, processes, scenarios, and sequences disclosed herein for a wireless access node may be implemented. Access node computing system 600 is an example of wireless access node 120 and eNodeB 520, although other examples may exist. Access node computing system 600 comprises communication interface 601, user interface 602, and processing system 603. Processing system 603 is linked to communication interface 601 and user interface 602. Processing system 603 includes processing circuitry 605 and memory device 606 that stores operating software 607. Access node computing system 600 may include other well-known components such as a battery and enclosure that are not shown for clarity. Computing system 600 may be a personal computer, server, or some other computing apparatus—including combinations thereof.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In particular, communication interface 601 may be configured to connect to network elements, such as gateways, routers, and the like to connect to the internet and other data networks. Further, communication interface may be configured to provide Long Term Evolution (LTE) communication format, or some other carrier aggregation wireless format to one or more wireless communication devices.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes exchange module 608, reorder module 609, and carrier aggregation (CA) module 610, although any number of software modules may provide the same operation. Operating software 607 may further include an operating system, utilities, drivers, network interfaces, applications, or some other type of software. When executed by processing circuitry 605, operating software 607 directs processing system 603 to operate access node computing system 600 as described herein.

In particular, exchange module 608 directs processing system 603 to exchange first signals with a WCD using a first carrier aggregation format, wherein the first carrier aggregation format includes a first scheduling algorithm. In some implementations, the first scheduling algorithm may schedule data packets for the WCD on a first available basis. Accordingly, as data packets are received from the network, access node computing system 600 may schedule the packets in the next available resource blocks.

During the communication reorder module 609 directs processing system 603 to determine packet reordering density for the communication based on one or more factors. The factors may include, but are not limited to DRX cycle asymmetry for the communication, traffic burst levels for the communication, available resource asymmetry for component carriers, and the number of component carriers involved in the communication. In some implementations, the factors may be used to derive a single value that corresponds to the packet reordering density. In other implementations, individual values associated with each of the factors may be used in defining the packet reordering density. Once the reordering density is determined, reorder module determines if the reordering density meets criteria to transition do a different scheduling algorithm. If the reordering density fails to meet the criteria, then the access node computing system will fail to transition to the alternative scheduling scheme. However, if the density meets the criteria, carrier aggregation module 610 will direct processing system 603 to identify a second carrier aggregation configuration, wherein the second carrier aggregation configuration includes an alternative scheduling scheme.

In some implementations, the alternative scheduling scheme may include the ability to schedule packets in the various component carriers based on the timing of the control signals to wake the device for the various carrier components, what are referred to as PDCCH signals for each of the carrier components. The alternative scheduling scheme may further schedule the packets based on the resource availability on each of the carrier components. In particular, CA module 610 may direct processing system 603 to bias scheduling of pending data packets to the carrier components with upcoming PDCCH signals. Accordingly, even if a carrier component may have an available resource block at an earlier time, data packets may be biased to a second carrier component with a PDCCH signal to the wireless device.

Although described herein as using multiple factors to generate the reordering density, it should be understood that a single factor might be used in some implementations. For example, the reordering density may be determined using the hurst parameter associated with a burst rating for the communication. The greater number of bursts in the communication, the more likely that the communication will meet criteria for changing the scheduling configuration.

Returning to the elements of FIG. 1, WCD 110 comprises Radio Frequency (RF) communication circuitry and an antenna. The RF communication circuitry typically includes an amplifier, filter, modulator, and signal processing circuitry. WCD 110 may also include a user interface, memory device, software, processing circuitry, or some other communication components. WCD 110 may comprise a telephone, computer, e-book, mobile Internet appliance, wireless network interface card, media player, game console, or some other wireless communication apparatus.

Wireless access node 120 comprises RF communication circuitry and at least one antenna to provide LTE wireless communications. The RF communication circuitry typically includes an amplifier, filter, RF modulator, and signal processing circuitry. Wireless access node 120 may also comprise a router, server, memory device, software, processing circuitry, cabling, power supply, network communication interface, structural support, or some other communication apparatus. Wireless access node 120 may comprise an eNodeB, a Femtocell, or some other device configured to provide LTE wireless communications.

Communication network 130 comprises network elements that provide communication services to WCD 110. Communication network 130 may comprise switches, wireless access nodes, Internet routers, network gateways, application servers, computer systems, communication links, or some other type of communication equipment—including combinations thereof. Communication network 130 may comprise the internet, an LTE wireless communication network, as well as other similar communication networks.

Wireless signaling 141 includes wireless links that use the air or space as transport media, and communicate with WCD 110 using LTE format. Communication link 140 could use various communication protocols, such as Time Division Multiplex (TDM), Internet Protocol (IP), Ethernet, communication signaling, wireless communication signaling, or some other communication format—including combinations thereof. Communication link 140 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access node to overcome packet reordering with carrier aggregation, the method comprising:
   communicating first signals with a wireless communication device using a first carrier aggregation configuration with a set of component carriers;
   determining an asymmetry value associated with asymmetry of discontinuous reception (DRX) cycles for the set of component carriers;
   identifying packet reordering density based on the asymmetry value;
   determining whether the packet reordering density meets density criteria;
   if the packet reordering density meets the density criteria, generating a second carrier aggregation configuration based on available resources of the set of component carriers; and
   communicating second signals with a wireless communication device using the second carrier aggregation configuration with the set of component carriers.

2. The method of claim 1 wherein the wireless access node comprises an eNodeB.

3. The method of claim 1 further comprising determining a hurst parameter for the first signals, and wherein identifying the packet reordering density based on the asymmetry value comprises identifying the packet reordering density based on the asymmetry value and the hurst parameter.

4. The method of claim 1 further comprising determining a quantity of component carriers in the set of component carriers, and wherein identifying the packet reordering density based on the asymmetry value comprises identifying the packet reordering density based on the asymmetry value and the quantity of component carriers.

5. The method of claim 1 further comprising determining a second asymmetry value based on a difference in resources for the set of component carriers, and wherein identifying the packet reordering density based on the asymmetry value comprises identifying the packet reordering density based on the asymmetry value and the second asymmetry value.

6. The method of claim 1 wherein communicating the first signals with the wireless communication device comprises communicating first Long Term Evolution (LTE) signals with the wireless communication device, and wherein communicating the second signals with the wireless communication device comprises communicating second LTE signals with the wireless communication device.

7. The method of claim 1 wherein determining the asymmetry value comprises determining a maximum time difference between physical downlink control channel (PDCCH) signals for component carriers in the set of component carriers.

8. The method of claim 1 wherein generating the second carrier aggregation configuration based on the available resources of the set of component carriers comprises generating the second carrier aggregation configuration based on the available resources of the set of component carriers and timing of physical downlink control channel (PDCCH) signals to the wireless communication device.

9. The method of claim 1 wherein the first carrier aggregation configuration comprises a first scheduling algorithm and the second carrier aggregation configuration comprises a second scheduling algorithm.

10. An apparatus to overcome packet reordering with carrier aggregation in a communication, the apparatus comprising:
one or more non-transitory computer readable media; and
processing instructions stored on the one or more non-transitory computer readable media that, when executed by a processing system, direct the processing system to:
communicate first signals with a wireless communication device using a first carrier aggregation configuration with a set of component carriers;
determine an asymmetry value associated with asymmetry of discontinuous reception (DRX) cycles for the set of carrier components;
identify packet reordering density based on the asymmetry value;
determine whether the packet reordering density meets density criteria;
if the packet reordering density meets the density criteria, generate a second carrier aggregation configuration based on timing of physical downlink control channel (PDCCH) signals to the wireless communication device;
communicate second signals with a wireless communication device using the second carrier aggregation configuration with the set of component carriers.

11. The apparatus of claim 10 wherein the processing instructions further direct the processing system to determine a hurst parameter for the first signals, and wherein processing instructions to identify the packet reordering density based on the asymmetry value direct the processing system to identify the packet reordering density based on the asymmetry value and the hurst parameter.

12. The apparatus of claim 10 wherein the processing instructions further direct the processing system to determine a quantity of component carriers in the set of component carriers, and wherein the processing instructions to identify the packet reordering density based on the asymmetry value direct the processing system to identify the packet reordering density based on the asymmetry value and the quantity of component carriers.

13. The apparatus of claim 10 wherein the processing instructions further direct the processing system to determine a second asymmetry value based on a difference in resources for the set of component carriers, and wherein the processing instructions to identify the packet reordering density based on the asymmetry value direct the processing system to identify the packet reordering density based on the asymmetry value and the second asymmetry value.

14. The apparatus of claim 10 wherein the processing instructions to communicate the first signals with the wireless communication device direct the processing system to communicate first Long Term Evolution (LTE) signals with the wireless communication device, and wherein the processing instructions to communicate the second signals with the wireless communication device direct the processing system to communicate second LTE signals with the wireless communication device.

15. The apparatus of claim 10 wherein the processing instructions to determine the asymmetry value direct the processing system to determine the maximum time difference between PDCCH signals for component carriers in the set of component carriers.

16. The apparatus of claim 10 wherein the processing instructions to generate the second carrier aggregation configuration based on the timing of the PDCCH signals to the wireless communication device direct the processing system to generate the second carrier aggregation configuration based on the timing of the PDCCH signals to the wireless communication device and available resources of the set of component carriers.

17. The apparatus of claim 10 wherein the first carrier aggregation configuration comprises a first scheduling algorithm and the second carrier aggregation configuration comprises a second scheduling algorithm.

18. The apparatus of claim 10 wherein the first scheduling algorithm comprises a first available resource block algorithm in the set of component carriers.

19. A method of overcoming packet reordering in a communication using carrier aggregation, the method comprising:
in a wireless access node, communicating first signals with a wireless communication device using a first carrier aggregation configuration with a set of component carriers;
determining values for one or more reordering factors related to the set of component carriers;
identifying packet reordering density based on the values for the one or more reordering factors;
determining whether the packet reordering density meets density criteria;
if the packet reordering density meets the density criteria, generating a second carrier aggregation configuration based on available resources of the set of component carriers; and
communicating second signals with a wireless communication device using the second carrier aggregation configuration with the set of component carriers.

20. The method of claim 19 wherein the first carrier aggregation configuration comprises a first scheduling algorithm and the second carrier aggregation configuration comprises a second scheduling algorithm.

* * * * *